United States Patent Office

2,760,861
Patented Aug. 28, 1956

2,760,861

DIGESTION OF LIGNO-CELLULOSE MATERIAL WITH HALOGEN-SUBSTITUTED SATURATED ALIPHATIC ALDEHYDES

Kenneth E. Furman, Richmond, and Paul C. Watt, Jr., San Francisco, Calif., assignors to Shell Development Company, New York, N. Y., a corporation of Delaware No Drawing. Application March 5, 1954,
Serial No. 414,506

5 Claims. (Cl. 92—2)

This invention relates to a process for the separation and recovery of cellulose and lignin from lignin-containing cellulosic materials such as the various hard and soft woods, various vegetable straws and other fibrous vegetable materials. The invention relates especially to the preparation of wood pulp and lignin from soft woods.

Fibrous plant materials, such as the hard woods and soft woods; straws, such as flax straw and wheat straw; and other vegetable fibrous materials, such as jute and bagasse, form a valuable source of raw materials for the manufacture of various paper products, wallboard, insulating board and the like. The materials consist primarily of a major proportion of cellulose fibers together with a minor amount of lignin as binding agent and a relatively small amount of other materials, such as various carbohydrates, oils, resins, waxes and the like. In forming paper products the desirable portion of the wood is the cellulose, lignin and the other components being considered undesirable impurities. Therefore, in transforming these fibrous vegetable materials into paper or other products the primary processing is for the purpose of lignin removal.

Current practice for effecting the separation of cellulose from lignin comprises treating the vegetable fibrous materials with bisulfite or alkali solutions at temperatures of about 150° C. to effect solution of the lignin. These methods, even when carried out under carefully controlled conditions, leave much to be desired, for the cellulose fibers themselves are attacked to some degree and thus are weakened and less satisfactory for many purposes. Also, the cellulose product of these methods often has a low alpha cellulose content and, for a number of industrial purposes such as in the preparation of rayon, must be treated further to increase its alpha cellulose content. It is thus desirable that there be available a process for effecting separation of cellulose from lignin which gives as product strong cellulose fibers of uniform size and shape containing a high percentage of alpha cellulose.

The lignin content of many common woods comprises as much as 25 to 35% or more of the dry weight of such woods. It is known that the lignin as it exists in the untreated wood shows great promise as a possible raw material in industry. For example, it is known that lignin may be polymerized under certain conditions to form valuable resinous products. Further, lignin shows promise as a filler and anti-oxidant in the rubber industry and in the lacquer and varnish industry. Lignin forms an excellent source for the production of methanol. The lignin product that has been produced heretofore, however, has differed chemically from the lignin in situ in the wood and has been found to possess few possibilities commercially. Thus, in normal wood pulping operations the extracted lignin, in whatever chemical form or combination it may be present, is discarded in the waste liquors and is lost. Also, disposal of such waste liquors in a manner that will not cause water, air or land pollution presents a serious problem. For these reasons, there is a substantial demand for a process which will remove lignin from various woods and other fibrous vegetable materials without changing the chemical character of the lignin or the chemical or physical character of the cellulose fibers. Applicants have discovered a process which solves this problem as well as that of producing a high-grade cellulose to a marked degree.

The novel process comprises digesting a fibrous vegetable material containing a major proportion of cellulose fibers bound together by lignin with one or more halogenated aliphatic aldehydes for a sufficient time to effect solution of the lignin, followed by separation of the cellulose fibers from the solution.

It has been found that when a material such as birch wood is treated according to this method the lignin will be completely dissolved without any accompanying attack on the cellulose fibers or the production of significant amounts of other by-products such as sugars or organic acids which are usually present in the lignin solution obtained by prior art processes.

The cellulose fibers, following separation from the digesting liquid, are washed preferably with a fresh portion of the aldehyde in which they were digested, are dried and may then be used for the manufacture of paper products or for other uses to which cellulose fibers are adapted. The solution recovered from the cellulose may be reused until nearly saturated with lignin, at which point the lignin may be recovered by distillation of the solvent.

As the solvent for the lignin there may be used any halogenated saturated aliphatic aldehyde having no more than 6 carbon atoms per molecule. Included in this class of compounds are the monohalogenated aldehydes and the polyhalogenated aldehydes. It is preferred that the aldehyde contain no more than 4 carbon atoms. While the term "halogen" is intended to include all of the halogens—e. g., chlorine, bromine, fluorine and iodine—it is preferred that the halogen substituent be a middle halogen—e. g., either chlorine or bromine. Of these it is preferred that the halogen-substituent group be chlorine. Examples of the aldehydes which can be employed include mono-, di- and trichloroacetaldehyde, alpha,alpha- and alpha,beta-dichloropropionaldehyde, alpha-beta-dibromopropionaldehyde, alpha,beta-dichloro-n-butyraldehyde, alpha - chloro - alpha,beta - dibromobutyraldehyde, alpha-chloro-isobutyraldehyde, alpha,beta-chloroisobutyraldehyde, alpha,alpha,beta - trichloropropionaldehyde, alpha,alpha,gamma - trichloro - n - butyraldehyde, alpha, alpha-dichlorovaleraldehyde, the various mono-, di-, tri- and tetrachlorohexaldehydes, and the like. Of all of these aldehydes, alpha,beta-dichloropropionaldehyde is preferred because of its wide availability and desirable characteristics as a solvent.

The solution of lignin is effected by introducing the wood or other fibrous vegetable material into a digester or pulp-cooking apparatus together with a substantial excess of the solvent. While the proportion of solvent to the fibrous material is not critical, provided there is sufficient solvent to dissolve all of the lignin present, it is desirable that there be used a weight of solvent equal to at least 5 and preferably from about 10 to about 20 times the weight of the fibrous material treated. It is desirable that the fibrous material be in the form of chips, splinters, or sawdust, or other form which provides a high surface area per unit weight.

The digestion is carried out by heating the mixture of vegetable material and solvent. The minimum temperature is fixed by the rate of solution desired, the maximum temperature being determined by the boiling point of the solvent employed or, in some cases, the temperature at which the solvent begins to decompose. It may be found desirable in some cases to add a material which will have the effect of neutralizing the decomposition products of the solvent. For this purpose there may be used any organic compound which will effectively remove from the solution any HCl formed from the decomposition of the solvent. For example, an excellent agent for such purpose is epichlorohydrin, which removes the HCl by reacting with it to form the dichlorohydrin. The amount of such HCl neutralizing agent need not exceed about 10% of the weight of solvent employed, and in the usual case, it is preferred to add a weight of the neutralizing agent equivalent to from about 1% to about 2% of the weight of solvent employed. In general, it will be found desirable to employ temperatures of at least 30° C. but seldom necessary to employ temperatures above 150° C. It is preferable that the lowest possible temperature be employed consistent with obtaining a reasonable rate of solution, for many of the class of solvents employed tend to decompose at higher temperatures especially if water is present in the reaction zone. If found desirable to the attainment of practical rates of solution, either superatmospheric or subatmospheric pressure may be employed although, in general, operation at substantially atmospheric pressure is preferred.

Substantially complete solution of the lignin can usually be effected in a period of from about 5 to about 20 hours, depending in part upon the temperature employed, the nature of the fibrous material, the size of the particles thereof and whether or not the mixture is stirred or agitated. The mixture may be stirred or not, as desired and, if stirred, may be stirred at any rate desired. It is preferred that the mixture be slowly stirred or agitated intermittently, for this technique provides for maximum rates of solution without weakening the cellulose fibers.

After the digestion is complete, the cellulose product, if not already broken up by stirring, is reduced to individual fibers as by mechanical agitation and filtered from the lignin solution. The cellulose fibers are then washed with a small amount—approximately an equal part by volume—of fresh solvent. The cellulose is again filtered free of solvent and dried, preferably under vacuum, to remove all of the solvent. Alternatively, the cellulose fibers, freed from solvent, may be washed with other organic liquids to insure that all of the solvent is removed. Suitable liquids for this purpose include various hydrocarbons, technical mixtures thereof, or other aldehydes or ketones. Exemplary of the hydrocarbons which may be employed are the alkanes which are liquid at ordinary conditions, petroleum fractions, which are normally liquids, or like mixtures of hydrocarbons. As the aldehyde or ketone, there may be employed acetaldehyde, acetone, methyl ethyl ketone, diisopropyl ketone, or the like. The amount of such liquid which is employed is not critical, but should be sufficient to insure removal of all traces of the solvent. The lignin solution may be reused if desired until nearly saturated with lignin. The cellulose so obtained may be used for any desired purpose. It will be found to comprise, according to the wood or fibrous material treated, the size of the chips or splinters and so on, strong fibers of cellulose suitable for the production of high grade paper products and/or the production of such chemical derivatives as rayon.

The solution separating from the cellulose when nearly saturated is passed to an evaporator and the solvent removed by distillation. It is desirable that this distillation be carried out under vacuum so that the solvent will not be decomposed or, alternatively, the lignin will not become so hot as to cause its chemical alteration or to cause undesired side reactions with the solvent or its decomposition products. The lignin, free from solvent, may be used for the purposes heretofore indicated. The recovered solvent is returned to the digester for further use.

The following example illustrates the practice of applicants' novel process: 10 parts of yellow birch wood chips were digested with 100 parts of alpha,beta-dichloropropionaldehyde for 10 hours at approximately 75° C. The mixture was slowly agitated from time to time during the course of the digestion. At the end of this time the wood chips were completely disintegrated into a fibrous pulp. The pulp was separated from the liquid by filtration and was washed with about an equal volume of fresh alpha,beta dichloropropionaldehyde. The pulp was then dried under vacuum (50 mm. pressure) at approximately 75° C. The product thus obtained comprised a mat of flexible cellulose fibers of uniform size which showed no evidence of attack by the solvent. The fibers showed no evidence of loss of strength due to the treatment and were not brittle. The lignin solution was passed to a vacuum evaporator where the solvent was removed by evaporation at 48° C. (15 mm. pressure). The pressures are reported in millimeters of mercury.

We claim as our invention:

1. A process for the production of cellulose fibers and lignin separately comprising digesting, at a temperature below about 150° C., a lignin-containing cellulosic material in at least one halogen-substituted saturated aliphatic aldehyde containing up to six carbon atoms as solvent for the lignin and separating the cellulose from the solution of lignin.

2. The process of claim 1 in which the aldehyde solvent is a chlorine-substituted aliphatic aldehyde.

3. The process of claim 1 in which the aldehyde solvent is alpha,beta-dichloropropionaldehyde.

4. The process of producing pulp from wood chips which comprises digesting, at a temperature below about 150° C., said wood chips in a digestion solution comprising essentially at least one halogen-substituted saturated aliphatic aldehyde containing up to six carbon atoms, and separating the resulting pulp from the accompanying liquor.

5. The process of treating lignin-containing fibrous plant materials to recover lignin therefrom which comprises digesting, at a temperature below about 150° C., said plant materials in a digestion solution comprising at least one halogen-substituted saturated aliphatic aldehyde containing up to six carbon atoms as solvent for the lignin, separating the solid matter present from the accompanying liquor and removing lignin from said solvent.

References Cited in the file of this patent

UNITED STATES PATENTS

| 1,705,424 | Strecker | Mar. 12, 1929 |
| 2,070,585 | Dreyfus | Feb. 16, 1937 |
| 2,156,160 | Olson et al. | Apr. 25, 1939 |
| 2,668,761 | Bate et al. | Feb. 9, 1954 |

FOREIGN PATENTS

| 412,235 | Germany | Apr. 17, 1925 |